United States Patent
Bratzler et al.

[15] 3,637,352
[45] Jan. 25, 1972

[54] PROCESS OF PURIFYING SULFUR-CONTAINING EXHAUST GASES AND OF RECOVERING SULFUR

[72] Inventors: Karl Bratzler, Bad Homburg v.d.H.; Wilhelm Herbert, Frankfurt/Main; Reinhard Hoehne, Neu Isenburg; Klaus Storp, Frankfurt/Main, all of Germany

[73] Assignee: Metallgesellschaft Aktiengesellschaft, Frankfurt/Main, Germany

[22] Filed: Feb. 3, 1969

[21] Appl. No.: 807,160

[30] Foreign Application Priority Data

Feb. 2, 1968  Germany ................... P 16 67 636.1

[52] U.S. Cl. ............................................................ 23/225 P
[51] Int. Cl. ............................................................ C01b 17/04
[58] Field of Search .................................... 23/225–226, 2.1

[56] References Cited

UNITED STATES PATENTS

| | | | |
|---|---|---|---|
| 1,479,852 | 1/1924 | Engelhardt | 23/225 |
| 2,742,346 | 4/1956 | Miller | 23/225 |
| 2,758,913 | 8/1956 | Pearce | 23/225 |
| 2,760,848 | 8/1956 | Dunning | 23/225 |
| 3,116,970 | 1/1964 | Storp et al. | 23/225 |

FOREIGN PATENTS OR APPLICATIONS

| | | | |
|---|---|---|---|
| 697,672 | 9/1953 | Great Britain | 23/226 |
| 722,038 | 1/1955 | Great Britain | 225/ |
| 744,908 | 2/1956 | Great Britain | 23/226 |
| 505,889 | 9/1954 | Canada | 23/226 |

*Primary Examiner*—Oscar R. Vertiz
*Assistant Examiner*—G. O. Peters
*Attorney*—Burgess, Dinklage & Sprung

[57] ABSTRACT

A process of purifying gas which contains hydrogen sulfide and sulfur dioxide, and simultaneously recovering sulfur, comprising contacting said gas with activated carbon at an elevated temperature for adsorption of sulfur by the activated carbon and subsequently regenerating the activated carbon, characterized in that the hydrogen sulfide to sulfur dioxide ratio in the gas is 2.5:1 to 4.0:1, the gas is treated in two successive stages each of which contains activated carbon, the first stage being operated at a temperature of 120°–200° C. and causing hydrogen sulfide and sulfur dioxide to react according to the reaction equation $2H_2S+SO_2 \rightarrow 2H_2O+3S$, oxygen is added to the gas which has been treated in the first stage, said gas is subsequently passed at temperatures below 200° C. through the second stage containing activated carbon for reaction according to the equation $2H_2S+O_2 \rightarrow 2H_2O+2S$.

15 Claims, 1 Drawing Figure

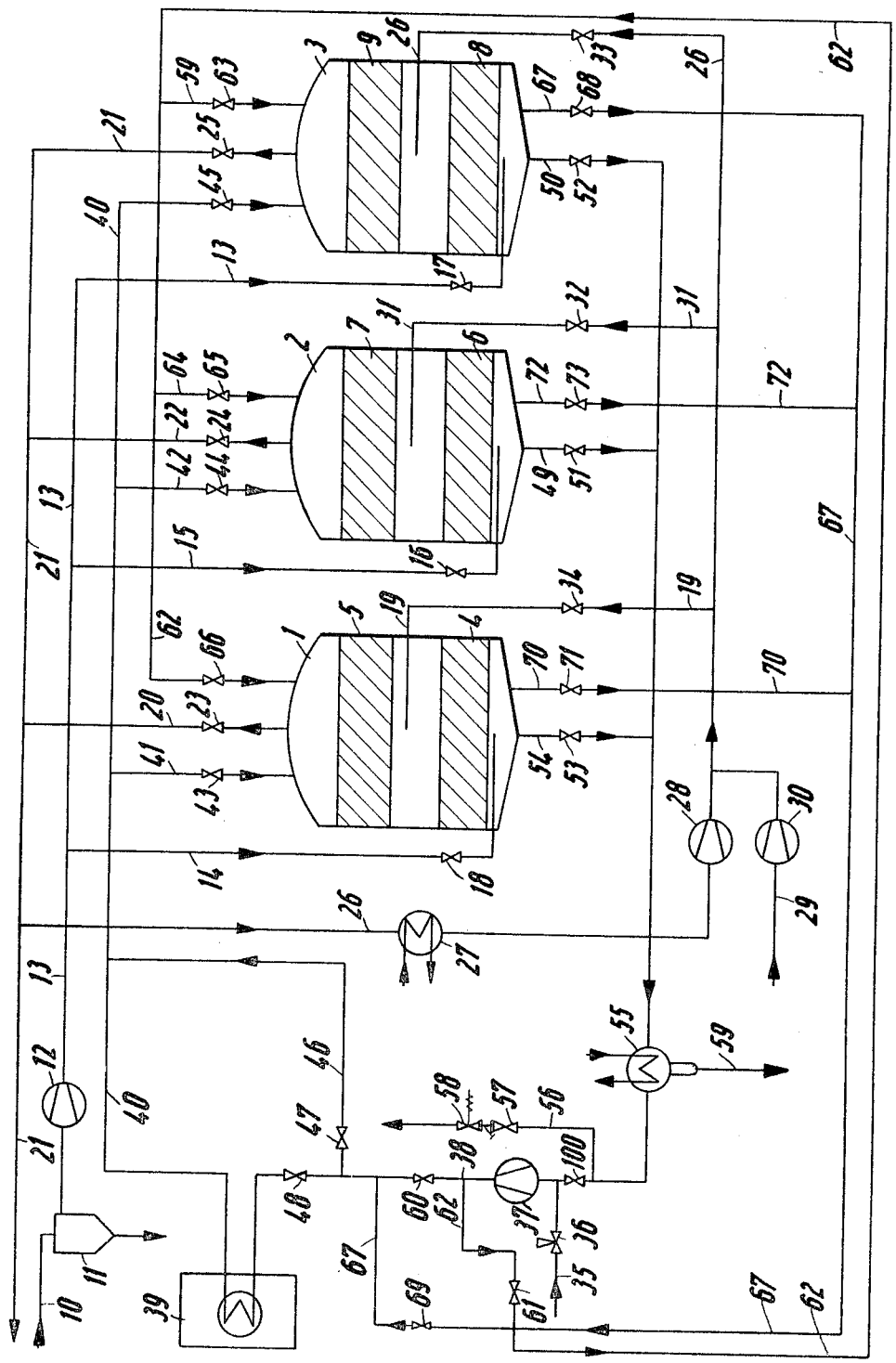

PROCESS OF PURIFYING SULFUR-CONTAINING EXHAUST GASES AND OF RECOVERING SULFUR

Industrial exhaust gases, particularly those from the Claus furnace process and the processing of pyrites, in many cases still contain considerable amounts of $H_2S$ and $SO_2$. The regulations to prevent a pollution of the air do not permit of a discharge of these constituents into the atmosphere. Because the air contains in most cases other industrial exhaust gases, the discharge of the above-defined exhaust gases through high stacks is also unsatisfactory.

It has been attempted to improve the industrial process and to use succeeding purifying processes, such as scrubbing processes using salt, after burning, and processes using activated carbon.

It is known to use activated carbon for a removal of sulfur from gases, such as exhaust gases which contain $H_2S$ and $SO_2$. These processes are subject to limitations if $H_2S$ and $SO_2$ are present at the same time because the reaction $2H_2S+SO_2 \rightarrow 3S+2H_2O$ is not complete on activated carbon. Whereas it is stated in the German Pat. No. 371,400 that the reaction is complete, only part of the sulfur of $H_2S$ and $SO_2$ is adsorbed by the activated carbon in practice even in the optimum temperature range of 120°-160° C. (about 70 percent in the case of a fluid space velocity of 1.25 standard cubic meters per hour per kilogram of catalyst). This will not result in an adequate purification.

It is an object of the invention to improve the purity which can be obtained in the purification of exhaust gases which contain hydrogen sulfide and sulfur dioxide.

The invention relates to a process of purifying exhaust gases which contain hydrogen sulfide and sulfur dioxide, preferably exhaust gases from the Claus process, in conjunction with a simultaneous recovery of sulfur, comprising an adsorption on activated carbon at an elevated temperature and a subsequent regeneration of the activated carbon. The process according to the invention is characterized in that the proportion of hydrogen sulfide to sulfur dioxide is 2.5:1 to 4.0:1, preferably about 3:1, in the gas and the gas is treated in two successive stages which contain activated carbon, the first stage being operated at a temperature of 120°-200° C., preferably 120°-180° C. or better 120°-160° C. and causing hydrogen sulfide and sulfur dioxide to react according to the reaction equation $2H_2S+SO_2 \rightarrow 2H_2O+3S$, oxygen or air is added to the gas which has been treated in the first stage, said gas is subsequently passed at temperatures below 200° C. through the second stage containing activated carbon, and a reaction mainly according to the reaction equation $2H_2S+O_2 \rightarrow 2H_2O+2S$ takes place in the second state.

According to the present invention, the hydrogen sulfide to sulfur dioxide ratio is initially adjusted, as is necessary to provide a ratio of 2.5:1 to 4.0:1 in the exhaust gas to be purified. In the purification of exhaust gases from the Claus process, this ratio can be adjusted by a controlled supply of air to the Claus furnace. Alternatively, the said ratio can be adjusted by recycling part of the Claus process exhaust gas to the Claus furnace. In the purification of Claus process exhaust gases and of other exhaust gases low in hydrogen sulfide, the ratio of hydrogen sulfide to sulfur dioxide can be adjusted by adding hydrogen sulfide to the exhaust gas to be purified. When a hydrogen sulfide to sulfur dioxide ratio of 2.5:1 to 4.0:1, preferably about 3:1, has been obtained in the exhaust gas to be purified, said gas is passed through a first activated carbon bed, in which a temperature of 120°-200° C., preferably 120°-160° C., is maintained. As the gas flows through the first activated carbon bed, hydrogen sulfide and sulfur dioxide are reacted according to the reaction equation $2H_2S+SO_2 \rightarrow 2H_2O+3S$. Before the gas which has been treated in the first activated carbon bed is introduced into the second stage containing activated carbon, oxygen or air or another oxygen-containing gas is added to the gas. In the activated carbon bed of the second treating stage, the hydrogen sulfide still contained in the exhaust gas to be purified is reacted to form sulfur according to the reaction equation $2H_2S+O_2 \rightarrow 2H_2O+2S$. During the treatment of the gas in the second stage containing activated carbon, an excessive temperature rise causing an ignition of the activated carbon must be prevented. This may suitably be effected in that a partial stream of the purified gases is cooled and is then added to the gas which has left the first stage containing activated carbon. The flow rate of this recycled cooling gas stream may be controlled in response to the temperature of the activated carbon in the second stage containing activated carbon so that the reaction temperature does not exceed 200° C. To avoid corrosion in the adsorber, in which the two activated carbon beds are suitably arranged one over the other, the temperature of the recycled cooling gas stream should suitably be above the dew point of water. Temperatures of about 75° C. have proved satisfactory in practice. Before entering the second stage containing activated carbon, the oxygen which is required for the oxidation of the hydrogen sulfide is suitably added together with the cooling gas to the gas which flows out of the first stage containing activated carbon. Oxygen is generally added in the form of air, but this may be replaced by another suitable oxygen-containing gas. The rate at which oxygen is added will depend on the temperature in the second stage containing activated carbon. For an optimum conversion, the oxygen rate should generally be about 1.4-1.6, preferably 1.45-1.55 or generally best 1.5 times the rate at which oxygen is stoichiometrically required. If the oxygen addition rate is properly controlled, the undesired formation of sulfur dioxide during the oxidation of hydrogen sulfide will be highly restricted. A suitable catalyst, such as ammonia or iodine or iodides, may be added to the activated carbon.

The activated carbon is regenerated when it has been saturated with sulfur. The regeneration is suitably effected with a hot inert gas at temperatures of 350°-550° C. The inert gas must be free of oxygen, carbon dioxide and hydrogen because oxygen, carbon dioxide and water would react with the activated carbon under the desorption conditions and this would result in considerable losses of activated carbon. Where an inert gas is used which is contaminated with, e.g., 0.2 percent oxygen, the loss of activated carbon in ten regeneration treatments is 8 percent. Suitable inert gases are, e.g., pure nitrogen or rare gases. In the process according to the invention, pure nitrogen is preferably used for a desorption of the sulfur-laden activated carbon. Methane is not desirable as a desorbent because it forms carbon disulfide under the desorption conditions. Before the sulfur-laden activated carbon is actually regenerated by a desorption effected by a hot inert gas, the stages containing activated carbon must be purged with hot inert gas to remove carbon dioxide and water from the adsorber, particularly from the stages containing activated carbon. For this purge, the inert gas is generally heated to temperatures of 160°-180° C. It will be suitable if the desorption gas is recirculated through the stages containing activated carbon during the regeneration. Compared to a single pass, the recirculation improves the heat balance and reduces the rate of inert gas required for the regeneration and the loss of activated carbon due to any contaminating oxygen to about one two-hundredths.

When the desorption gas heated to 350°-550° C. is passed through the activated carbon, the sulfur which is adsorbed on said carbon will be desorbed and entrained as vapor by the desorption gas. Sulfur is condensed as a liquid in a condenser, which is supplied with hot water at about 120°-130° C. If the desorption gas is recirculated, the residual sulfur content of the recirculated gas from which most of the sulfur has been removed by condensation will correspond to the saturation vapor pressure at 120°-130° C. If the desorption gas were now returned to the stages which contain activated carbon to be regenerated, a subsequent adsorption of sulfur on the activated carbon would be inevitable. For this reason, the residual sulfur still contained in the recirculating gas from which most of the sulfur has been removed by condensation is, in accordance with the invention contacted with active carbon for reduction of the residual sulfur in the gas, in a separate stage. For this purpose, a laden absorber is used which has previously been employed in the process according to the invention to purify the exhaust gas which contains hydrogen sulfide and sulfur dioxide. Such adsorber which contains two stages containing activated carbon laden with about 80–100 percent sulfur by weight has still as adequate sorption capacity for the sulfur contained in the recirculated desorption gas.

The process according to the invention enables a conversion of at least 90 percent, on a time average, of the hydrogen sulfide and sulfur dioxide content of the exhaust gases to be purified, so that in practice, e.g., in the treatment of Claus furnace exhaust gases containing 2.8 percent by volume $H_2S+H_2O$, the sulfur compounds in the purified exhaust gas are reduced to residual contents of 0.09 percent hydrogen sulfide and 0.14 percent sulfur dioxide. Because it results in a recovery of sulfur, the process according to the invention substantially improves the economy of the Claus furnace process. By the process according to the invention the yields of the Claus process are increased from 92–94 percent to about 98.5 percent.

Where a gas of particularly high purity is required, ammonia at a small rate is supplied in addition to oxygen to the second stage containing activated carbon. This will further reduce the content of sulfur compounds in the purified exhaust gas.

FLOW DIAGRAM

The process according to the invention will now be explained more fully with reference to the drawing, which shows a flow diagram of a plant for carrying out the process according to the invention where pure nitrogen is used to regenerate the stages containing activated carbon.

The plant consists essentially of three adsorbers 1, 2 and 3. Each of said adsorbers contains two beds of activated carbon. The individual beds of activated carbon are designated 4, 5, 6, 7, 8, and 9. The adsorbers are sequentially connected in the adsorption and regeneration flow paths, respectively. In the following explanation of the process it will be assumed that the adsorber 1 is in adsorption condition and adsorber 2 in regenerating condition. The adsorber 3 serves for a fine purification of the recirculated desorption gas.

The exhaust gas, in which a ratio of hydrogen sulfide to sulfur dioxide of 2.5:1 to 4.0:1 has been adjusted in accordance with the present invention, is fed to the plant in conduit 10 and is initially prepurified in the separator 11 to remove finely divided elementary sulfur. The blower 12 will then discharge the exhaust gas so that it flows in conduit 13 and in conduits 14 and 15, which branch from conduit 13, to the adsorber which is in adsorption condition. When the exhaust gas to be purified is supplied to the adsorber 1, the valves 16 and 17 in conduits 15 and 13 will be closed and valve 18 in conduit 14 will be opened. The exhaust gas to be purified enters the lower part of the adsorber 1 and flows from bottom to top through the activated carbon bed 4. Air and cooled, purified exhaust gas are supplied through the supply conduit 19 into the space between activated carbon beds 4 and 5. The addition of cooled, purified exhaust gas keeps the temperature in the activated carbon bed 5 below 200° C. The activated carbon bed 5 as well as the other activated carbon beds 4, 6, 7, 8 and 9 are carried by suitable gas-permeable supports, such as perforated plates. The gas mixture flows from bottom to top through the activated carbon bed 5, in which the conversion reaction $2H_2S+O_2 \rightarrow 2H_2O+2S$ takes place. The purified gas leaves the adsorber through conduit 20, which opens into conduit 21, in which the purified gas is discharged from the plant. Conduit 22 leads from the adsorber 2 to conduit 21. The valves 24 and 25 in the conduits 22 and 21 connected to the outlets of the adsorbers 2 and 3, respectively, are closed. Valve 23 in conduit 20 is open.

Conduit 26 branches from conduit 21, through which a partial stream of the purified gas is discharged from the blower 28 to the second activated carbon bed 5 in the adsorber 1 which is in adsorption condition. The recirculated partial stream of the purified gas is cooled in the cooler 27, which is incorporated in the conduit 26. Blower 30 discharges air through conduit 29 into conduit 26. Supply conduits 19 and 31 branch from conduit 26 and lead to adsorbers 1 and 2. In the operating condition which is discussed, valves 32 and 33 are closed and valve 34 in supply line 19 is open. The purified and cooled gas which has been branched off in conduit 26 is supplied together with the added air in supply conduit 19 to the gas which has left the activated carbon bed 4 before the latter gas enters the activated carbon bed 5.

Before a sulfur-laden adsorber is regenerated, the adsorber is purged with pure nitrogen at about 160°–180° C. to remove the carbon dioxide and water contained in the adsorber. Pure nitrogen is fed into the plant in conduit 35 and through valve 36 and is discharged by the blower 37 to flow in conduit 38 through heater 39, further in conduit 40 and in branch conduits 41 and 42 connected thereto to the adsorber which is to be desorbed. Valves 43, 44 and 45 serve to connect the individual adsorbers into the description flow path. The heater 39 is bypassed by conduit 46, which contains valve 47. Valve 48 is incorporated in conduit 38 behind that junction of conduit 46 which precedes the heater 39. Depending on the position of valves 47 and 48, the nitrogen flows through the heater 39 or bypasses the same. Alternatively, only a partial stream may be passed through the heater and the other partial stream may be passed through conduit 46. The ratio of the flow rates of the partial streams may be varied to control the nitrogen which is supplied to the adsorber to be desorbed. In the present case, the nitrogen which is heated to about 180° C. for the purging of the adsorber is supplied to the adsorber 2 in conduit 42 and through the open valve 44. Valves 43 and 45 are closed. Nitrogen flows from top to bottom through the two activated carbon beds 7 and 6 and leaves the adsorber 2 in conduit 49, which leads to conduit 49a. Valve 51 in conduit 49 is open. Valve 52 in the discharge conduit 50 of the adsorber 3 and valve 53 in the conduit 54 leading from adsorber 1 are closed. The nitrogen flowing through adsorber 2 entrains any carbon dioxide and water which are present. The gas mixture flows through the cooler 55 and is discharged through conduit 56 and the open valves 67 and 58. The valve 100 in the transfer conduit between conduits 50 and 38 is closed. When the absorber has been purged with hot nitrogen at about 180° C., valve 47 in bypass conduit 46 is closed and valve 48 is opened further. The major portion of nitrogen now flows through the heater 39 and the temperature of the nitrogen which flows into the adsorber to be desorbed increases. During the desorption proper, the activated carbon beds are heated to temperatures of 350°–550° C. at which the sulfur is desorbed and is entrained as vapor by the nitrogen. Sulfur vapor leaves the adsorber 2 together with the desorption gas in conduit 49 and flows in conduit 50 into the cooler 55, which is supplied with hot water at about 120°–130° C. so that sulfur is removed in liquid form until the saturation vapor pressure has been reached. The liquid sulfur is collected in the lower part of the condenser 55 and is withdrawn in conduit 59. With valve 100 open and valve 60 closed, valve 61 in conduit 62 open and valve 63 in the conduit 59, which branches from conduit 62, also open, the desorption gas coming from condenser 55 is discharged by the blower 37 to flow to the adsorber 3. Conduit 62 branches from conduit 38 between blower 37 and valve 60. The activated carbon beds of adsorber 3 are laden with sulfur from preceding operations and in the discussed example serve to remove residual sulfur from the desorption gas. Valves 66 in conduit 62 at the inlet of the adsorber 1 and valve 65 in the transfer conduit 64 between adsorber 2 and conduit 62, are closed. As a result, the desorption gas flows from top to bottom through the adsorber 3 and leaves the same in conduit 67 while valve 68 is open. Through the open valve 69, the desorption gas is returned in conduit 67 to conduit 38 at a point between valve 60 and the junction of conduit 46. To enable also the use of the two adsorbers 1 and 2 for a removal of residual sulfur when the arrangement has been changed over, the adsorbers 1 and 2 are connected to conduit 67 by transfer conduits 70 and 72, which contain valves 71 and 73. The desorption gas which has returned to conduit 48a is reheated to the desorption temperature in the heater 39 and via conduit 40 and branch conduit 42, returns to the adsorber 2 which is to be desorbed.

When the two activated carbon beds 6 and 7 in adsorber 2 have been desorbed, the desorption gas is no longer passed through adsorber 3 and the temperature of the latter is gradually lowered because heater 39 is bypassed. As a result, the activated carbon beds 6 and 7 are cooled. When the adsorber 2 has been cooled down, valves can be actuated to connect the adsorber 2 into the adsorption flow path. The adsorber 3 will then be desorbed and the adsorber 1 will serve to remove residual sulfur from the desorption gas.

EXAMPLE

A pilot plant designed in accordance with the drawing comprises three adsorbers, each of which contains 200 kilograms activated carbon. Claus furnace exhaust gas having an average content of 2.1 percent by volume $H_2S$ and 0.7 percent by volume $SO_2$ was passed through one adsorber at a rate of 180 standard cubic meters per hour.

The temperature of the gas before the inlet to the adsorber to be saturated was 120°–130° C. About 70 percent of the sulfur present after the Claus reaction was removed in the lower activated carbon bed. The upper activated carbon bed was separated by a perforated plate, which was disposed above an annular gas manifold for supplying cooling gas and atmospheric oxygen. Air at a rate of 7 standard cubic meters per hour was added for the oxidation of the $H_2S$ which was not converted in the first stage. To prevent the reaction temperature of the second stage from exceeding 200° C., purified gas at a rate of about 90 standard cubic meters per hour was cooled to 75° C. and together with the atmospheric oxygen was added to the prepurified gas before the second stage containing activated carbon.

The conversion of sulfur was about 98.2 percent at the beginning of the adsorption and about 80 percent when the activated carbon had reached a saturation of 90 percent by weight. The purified gas had an average sulfur content of 0.09% $H_2S$ and 14% $SO_2$.

To regenerate the sulfur-laden coal, pure nitrogen at a rate of 110 standard cubic meters per hour were circulated by a blower through the catalyst bed, a sulfur condenser combined with a cyclone, a previously laden adsorber and a heater.

The regeneration was carried out for nine hours by increasing the temperature of the catalyst bed to 490°–500° C. during four hours, then keeping the bed at these temperatures for one hour, and subsequently reducing its temperature to 160° C. during four hours. Before the beginning of the regeneration, the adsorber was purged to remove any $CO_2$ and $H_2O$ which were present by passing hot $N_2$ at 180° C. directly through the adsorber.

The sulfur which was removed in the sulfur condenser and in the cyclone was passed through a sulfur-collecting container, which was placed below the condenser.

The residual sulfur content of the catalyst bed averaged 11 percent.

What is claimed is:

1. A process of purifying gas which contains hydrogen sulfide and sulfur dioxide, and simultaneously recovering sulfur, comprising contacting said gas with activated carbon at an elevated temperature for adsorption of sulfur by the activated carbon and subsequently regenerating the activated carbon, characterized in that the hydrogen sulfide to sulfur dioxide ratio in the gas is 2.5:1 to 4.0:1, the gas is treated in two successive stages each of which contains activated carbon, the first stage being operated at a temperature of 120°–200° C. and causing hydrogen sulfide and sulfur dioxide to react according to the reaction equation $2H_2S + SO_2 \rightarrow 2H_2O + 3S$, oxygen is added to the gas which has been treated in the first stage, said gas is subsequently passed at temperatures below 200° C. through the second stage containing activated carbon for reaction according to the equation $2H_2S + O_2 \rightarrow 2H_2O + 2S$.

2. A process according to claim 1, characterized in that said ratio of hydrogen sulfide to sulfur dioxide is about 3:1.

3. A process according to claim 1, characterized in that said gas is the exhaust gas of a Claus furnace, and the hydrogen sulfide to sulfur dioxide ratio is adjusted by a controlled supply of air to the Claus furnace.

4. A process according to claim 1, characterized in that said gas is the exhaust of a Claus furnace, and the hydrogen sulfide to sulfur dioxide ratio is adjusted by a recycling of Claus process exhaust gases to the Claus furnace.

5. A process according to claim 1, characterized in that the hydrogen sulfide to sulfur dioxide ratio is adjusted by an addition of hydrogen sulfide to the gas to be purified.

6. A process according to claim 1, characterized in that a temperature of 120°–180° C. is maintained in the first stage containing activated carbon.

7. A process according to claim 1, characterized in that oxygen is added to the gas before the second stage containing activated carbon in such a proportion that the rate at which oxygen is added is about 1.5 times the rate which is stoichiometrically required.

8. A process according to claim 1, characterized in that the reaction temperature in the second stage containing activated carbon is kept below 200° C. by withdrawing a portion of the purified gas, cooling said portion, and adding the cooled gas to the gas which leaves the first stage containing activated carbon.

9. A process according to claim 8, characterized in that purified gas is recirculated as aforesaid only to such an extent that the temperature is above the dew point of water.

10. A process according to claim 1, characterized in that inert gas which is free of oxygen, carbon dioxide and water is passed at temperatures of 350°–550° C. stages which contain sulfur-laden activated carbon for regeneration thereof.

11. A process according to claim 10, characterized in that the gas used for regeneration is nitrogen.

12. A process according to claim 10, characterized in that the regeneration of the stages containing laden activated carbon is preceded by a purging thereof with hot inert gas to remove carbon dioxide and water from the stages containing laden activated carbon.

13. A process according to claim 12, characterized in that hot inert gas at 160°–180° C. is used for purging.

14. A process according to claim 10, characterized in that the desorption gas which has left the activated carbon beds being regenerated is subjected to an indirect heat exchange with hot water at about 120°–130° C. to remove sulfur.

15. A process according to claim 1, characterized in that the desorption gas is subjected to an indirect heat exchange to remove condensable sulfur, subsequently passed through sulfur-containing activated carbon beds to remove residual sulfur from the desorption gas, and is then recycled to the stages containing activated carbon to be regenerated.

* * * * *

UNITED STATES PATENT OFFICE
CERTIFICATE OF CORRECTION

Patent No. 3,637,352          Dated Jan. 25, 1972

Inventor(s) Karl Bratzler, et al

It is certified that error appears in the above-identified patent and that said Letters Patent are hereby corrected as shown below:

Col. 6, line 42 before "stages" insert --through--.

Signed and sealed this 15th day of August 1972.

(SEAL)
Attest:

EDWARD M. FLETCHER, JR.
Attesting Officer

ROBERT GOTTSCHALK
Commissioner of Patents